United States Patent [19]

Tomic

[11] 4,127,001
[45] Nov. 28, 1978

[54] INORGANIC CEMENT GROUTING SYSTEM FOR USE IN ANCHORING A BOLT IN A HOLE

[75] Inventor: Ernst A. Tomic, Wilmington, Del.

[73] Assignee: E. I. Du Pont de Nemours and Company, Wilmington, Del.

[21] Appl. No.: 830,474

[22] Filed: Sep. 6, 1977

[51] Int. Cl.$^2$ .......................... E21D 20/02; C04B 7/02
[52] U.S. Cl. ..................................... 405/261; 106/90; 166/293
[58] Field of Search .......................... 61/45 B, 63, 39; 166/293; 206/219; 106/89, 90, 95; 175/72, 68, 64

[56] References Cited

U.S. PATENT DOCUMENTS

| | | | |
|---|---|---|---|
| 2,609,880 | 9/1952 | Dyer | 220/840 X |
| 2,800,963 | 7/1957 | Roberts et al. | 166/293 |
| 2,878,875 | 3/1959 | Dunlap et al. | 166/293 |
| 2,890,752 | 6/1959 | Crone et al. | 166/293 |
| 3,119,448 | 1/1964 | Rhoades | 166/293 |
| 3,126,958 | 3/1964 | Bearden et al. | 166/293 |
| 3,145,774 | 8/1964 | Patchen | 166/293 |
| 3,197,428 | 7/1965 | Siegele | 166/293 |
| 3,212,269 | 10/1965 | Olsen | 61/45 B X |
| 3,242,986 | 3/1966 | Hower | 166/293 |
| 3,428,121 | 2/1969 | Harnsberger | 166/293 X |

FOREIGN PATENT DOCUMENTS

1,293,620  10/1972  United Kingdom ..................... 61/45 B

*Primary Examiner*—Dennis L. Taylor

[57] ABSTRACT

In an inorganic cement grouting system for use in anchoring a reinforcing member such as a rock bolt in a hole, e.g., in a mine roof, by the reaction of the mixed components of the system so as to form a hardened grout around the reinforcing member, the two separate components of the system are: (1) a slush or sludgy mass of a particulate inorganic cement, e.g., an hydraulic cement, and a liquid which is nonreactive therewith, preferably a hydrocarbon, and (2) a liquid, e.g., water, which is reactive with the cement; and sand is present in the cement slush and/or the reactive liquid. The sand is graded to the extent that the deviation from the median particle size is more than about ± 20, and usually more than about ± 30, percent; and particles larger than about 600 microns constitute no more than about 10 percent, and preferably about 5 percent or less, of the total volume of the sand. The inorganic cement constitutes more than 10 percent, and the weight of the sand is no more than about 80 percent, of the total weight of the two components. The two components preferably are delivered into the hole separately, e.g., from separate feeding conduits or, more preferably, in separate compartments of a frangible package, which is broken by the penetration and rotation of the reinforcing member.

Graded sand produces a grout having a higher shear strength than that produced from uniform sand, and the substantial absence of particles larger than about 600 microns facilitates packaging and insertion of the reinforcing member into the package.

7 Claims, No Drawings

INORGANIC CEMENT GROUTING SYSTEM FOR USE IN ANCHORING A BOLT IN A HOLE

BACKGROUND OF THE INVENTION

1. Field of the Invention

The present invention relates to an inorganic cement grouting system for use in a method of anchoring a reinforcing member in a hole, e.g., in a mine roof, wherein reactive inorganic cement components are introduced into a hole and allowed to react and harden therein around a reinforcing member so as to fix it firmly in the hole.

2. Description of the Prior Art

Anchor bolts are employed in various fields of engineering, for example as strengthening or reinforcing members in rock formations and in structural bodies. The bolts are inserted into drill holes in the formation or body, and often are fixed or anchored therein, at their inner end or over substantially their entire length, by means of a reactive grouting composition which hardens around the bolt. For mine roof support, grouting compositions which harden and attain maximum strength rapidly are needed. Reactive compositions which have been used include inorganic cement mortars and hardenable synthetic resins, and these have been introduced into the drill holes through a feed pipe, or in cartridged form. In the latter case, the reactive components, e.g., a polymerizable resin formulation and a catalyst which catalyzes the curing of the resin, are introduced into the hole in separate cartridges or in separate compartments of the same cartridge. A rigid bolt penetrates, and thereby ruptures, the cartridge(s) and the package contents are mixed by rotation of the bolt. The grouting mixture hardens around the bolt so as to anchor it in place.

In the case of inorganic cements, the pumping of a prepared hydraulic cement mortar into a hole after a bolt is in position therein has been described, as has the driving of a bolt into hydraulic cement mortar in a hole. In the former case, complete and uniform filling of the space around the bolt is difficult to ensure; and, in the latter case, the bolt has to be installed immediately after the mortar has been introduced, so that it is not feasible to fill a large number of holes with the mortar first and subsequently to introduce the bolts, a more efficient procedure.

Cartridged hydraulic cement systems for anchoring rock bolts are described in U.S. Pat. No. Re. 25,869, British Pat. Nos. 1,293,619 and 1,293,620, and German OLS No. 2,207,076. In these systems the components of an hydraulic cement mortar are introduced into a drill hole in separate compartments of an easily destructible cartridge. One component of the system, i.e., the hydraulic cement, is placed in one of the compartments in the dry particulate state, i.e., as a dry powder or grit; and the other component, i.e., water, is placed in the other compartment. The cartridge is broken and the components are mixed by driving and rotating the bolt therein. The cartridged system has the advantage that bolts can be installed in the holes at any time afte the introduction of the reactive components because the components are kept separated until the installation of the bolt. Also, such a system requires no complex pumping equipment at the site of use.

U.S. Pat. No. Re 25,869 discloses the use of a glass cylinder filled with a dry Portland cement/sand mixture which has embedded therein a glass capsule containing water and a rapid-hardening agent, e.g., calcium chloride, to shorten the hardening time.

British Pat. Nos. 1,293,619 and 1,293,620 describe the use of a cartridge consisting of inner and outer rigid brittle tubes having at least one end that is readily frangible, the space between the two tubes containing a mixture of Portland cement and high alumina cement, and the inner tube containing water. The addition of an aggregate, e.g., sand or copper slag, a gelling agent, and a wetting agent to the water also is disclosed.

In German OLS No. 2,207,706, the particulate material in one compartment is gypsum, preferably mixed with a strength-enhancing cement, to which an inert filler such as styrofoam may be added. The use of a gelling agent to increase the viscosity of the water in the other compartment also is disclosed.

Although inorganic cement grouting systems are economically attractive in contrast to resin-curing systems, and generally are not plagued with such problems as instability on storage as are resin-curing systems, cement grouting systems wherein one of the components is a dry cement present certain difficulties in use, especially when applied to the fixing of bolts in drill holes. When compartmented cartridges are used, the bolt must be inserted into the cartridge and penetrate its full length if the components are to be mixed properly. This insertion is difficult to achieve with cartridges containing a dry cement component. The magnitude of the force required to achieve the necessary insertion may exceed the capability of standard bolting equipment available in the working location, e.g., in a mine. Also, the insertion force required with such cartridges may cause the bolt to buckle.

Another problem with the cartridged dry cement component system of the prior art is that the cement component is easily vulnerable to premature hardening should ambient moisture or water from the other compartment penetrate the cartridge seals or packaging material, a situation which could arise on storage or during transportation of cartridges. Lastly, the prior art bolt-anchoring systems employing inorganic cement are not well-suited for use in the uncartridged form, where compact pumping equipment and accurate metering are desirable to deliver the components to the drill hole.

U.S. Pat. No. 3,324,663 describes the reinforcement of rock formations with a two-component resin composition based on (a) an unsaturated polymerizable polyester (alkyd) resin mixed with a monomeric polymerizable ethylenic compound and (b) a cross-linking peroxide catalyst system. A water-reactive filler such as Portland cement of plaster of Paris (5–10 percent of the final composition) is incorporated in either the resin component or the catalyst component, and water is incorporated in the component not containing the water-reactive filler. The water-reactive filler and water are used to modify the basic resin/catalyst system, the presence of water during the curing of the resin being disclosed as causing an imperfect cure and minimizing shrinkage. Water-reactive fillers (up to 5 percent) have been disclosed (U.S. Pat. No. 2,288,321)to shorten the curing time of alkyd resins by reacting with the water formed during curing.

In the grouting system of U.S. Pat. No. 3,324,663, the reactants essential for the formation of a hardened grout are totally organic, i.e., an alkyd resin and a liquid ethylenic monomer, and they are cartridged together in the same compartment, i.e., premixed, the resin being dissolved in the ethylenic monomer and reacting therewith when the separately packaged catalyst is mixed in. Only about 5–10 percent of the total composition is water-reactive filler. The preponderance of resin and catalyst in this system, and the basic resin-curing reaction that occurs, over-ride and obscure any possible secondary reaction involving the water-reactive filler.

Co-pending, co-assigned U.S. patent application Ser. No. 830,473, filed concurrently herewith by David Linn Coursen, describes an improved grouting system wherein a first component of an inorganic grouting composition is a slush or sludgy mass of a particulate inorganic cement, e.g. a cement that sets by hydration, and a liquid which is nonreactive therewith; and a second component of the composition is a liquid which is reactive with the inorganic cement in the first component. An aggregate such as sand preferably is present in one or both of the components, and the reactive liquid preferably is in thickened form.

Cement in slush form has several advantages over the dry cement used in previous rock bolt packages. First, the nonreactive liquid imparts lubricity to the cement so that when the two components of the grouting composition are packaged in a compartmented cartridge, a bolt can be inserted into the cartridge easily and rapidly. Also, the nonreactive liquid, if substantially immiscible with the reactive liquid, helps to reduce the possibility of the premature setting of the cement as a result of contact with the reactive liquid or its vapors, e.g., ambient moisture, during storage or handling, thereby affording a longer shelf life to the cartridged system. In addition use of the cement in slush form enables the cement component to be metered accurately and handled in compact pumps for ease of packaging in high-speed form-fill machinery as well as for on-site feed operations. The cement component in slush form also is advantageous in that it is adapted to be delivered intermittently in relatively small quantities as is required for bolt anchoring in holes.

The presence of sand in a controlled amount as a filler in one or both of the components of the grouting composition can contribute to high shear strength in the hardened grout. However, the strength-increasing effect of some sands is minimal, and the sand can cause packaging and bolt insertion problems.

SUMMARY OF THE INVENTION

The present invention provides an improvement in a grouting system for use in a hole in combination with a reinforcing member wherein a hardened grout is formed around the reinforcing member in the hole by the reaction of two mixed components of a sand-containing inorganic grouting composition, thereby anchoring the reinforcing member in the hole, a first component of the inorganic grouting composition being a slush or sludgy mass of a particulate inorganic cement, e.g., an hydraulic cement, and a liquid, such as a hydrocarbon, which is non-reactive therewith; a second component, separated from the first, being a liquid, e.g., water, which is reactive with the inorganic cement in the first component; the improvement comprising, as the sand, a graded sand wherein the deviation from the median particle size of a size cut which includes 90 percent or more of the particles is more than about ± 20, and usually more than about ± 30, percent, and wherein particles larger than about 600 microns constitute no more than about 10, and preferably no more than about 5, percent of the total volume of the sand. In a preferred composition, the sand constitutes about from 20 to 80 percent of the total weight of the two components, and the liquid which is reactive with the cement is in thickened form.

In a preferred grouting system of the invention, which finds particular use in the reinforcement of mine roofs wherein the grouting composition has to set up fast enough to provide high strength in a very short time, grouting compositions are employed which harden relatively rapidly, e.g., compositions containing calcined gypsum or Very High Early Strength cement (described in U.S. Pat. No. 3,860,433) in the first component and water as the second component, or wherein the cement in the first component is an alkaline earth metal oxide and the second component is a phosphoric acid or phosphate solution.

The term "inorganic cement" as used herein to describe the particulate solid reactant in the first component or package compartment denotes a particulate inorganic composition that sets up and hardens to a strong, dense monolithic solid upon being mixed with a liquid and allowed to stand. The term includes hydraulic cements, i.e., those that are capable of setting and hardening without contact with the atmosphere due to the interaction of the constituents of the cement rather than by the evaporation of a liquid vehicle or by reaction with atmospheric carbon dioxide or oxygen. Examples of such cements are Portland cements, high-alumina cements, pozzolanas, and gypsum plasters, which set up when mixed with water; lead oxide, which sets up when mixed with glycerin; as well as the more rapid-setting metal oxide compositions, e.g., magnesium oxide, which set up rapidly when mixed with phosphoric acid or phosphate solutions. The fast setting reaction that occurs between metal oxides such as magnesium oxide and phosphates or phosphoric acid is well-known, and is described, for example, in U.S. Pat. Nos. 3,285,758, 3,821,006, 3,879,209, 3,923,534, 3,923,525 and 3,960,580 and German OLS No 25 53 140.

The term "slush" as used herein to describe the first component of the grouting composition denotes a solid-liquid combination of mud-like or sludgy consistency. The term includes solid-liquid combinations of varying degrees of mobility, but in all cases denotes combinations that are readily pumpable.

The term "liquid" as used herein to describe the second component of the grouting composition which is reactive with the inorganic cement in the first component is used in the conventional sense to denote single-phase materials as well as solutions. Also, the reactivity of this liquid with respect to the cement may be produced in situ when the components are brought together, as will be described hereinafter.

The nonreactivity of the liquid in the slush which constitutes the first component or which is present in the first package compartment refers to the substantial inertness of this liquid with respect to the solid cement and other materials present therein. Such liquid may, however, be reactive with a material in the second component or compartment, and may have some influence on the setting time and ultimate strength of the grout.

DETAILED DESCRIPTION

In the grouting system of this invention, an inorganic cement is maintained in the form of a slush or sludgy mass together with a which it does not react, e.g., an inert nonaqueous liquid, preferably a hydrocarbon, in the case of a cement that sets by hydration; and the slush is brought together and mixed, preferably in a drill hole, with a reactive liquid, e.g., water in the case of a cement that sets by hydration, and allowed to react in the hole around a reinforcing member. Sand is present in the slush and/or the reactive liquid.

A wide variety of liquids can be used as the slush-forming liquid with the cement in the first component of the grouting composition. The specific choice in any given case will be made on the basis of the nature of the cement, the setting and strength-development time required with the slush-forming liquid, and the latter's cost. Liquid hydrocarbons and mixtures (which must be essentially anhydrous for use with cements that set by hydration) containing such hydrocarbons are particularly advantageous from the point of view of setting time as well as cost, and therefore are preferred. A substantially nonvolatile liquid is preferred to assure stability under varying conditions of storage and use. For this reason, liquids boiling above about 25° C. at atmospheric pressure are preferred. Thus, preferred hydrocarbon slush-forming liquids are 5-25 carbon atom aliphatic hydrocarbons such as hexanes, heptanes, and octanes; and aromatic hydrocarbons such as benzene and alkyl benzenes, e.g., toluene and xylene. Aromatic or aliphatic hydrocarbon mixtures such as gasoline, naphtha, kerosene, paraffin oil, diesel fuel, fuel oils, lubricating oils, vegetable oils, e.g., linseed, tung, cottonseed, corn, and peanut oils, and crudes such as petroleum and shale oil also can be employed. For use in coal mines, the liquid in the slush must have a flash point above 100° F., and should be low in volatile aromatics.

Although low-viscosity slush-forming liquids are preferred, thick liquids such as asphalt, grease, e.g., hydrocarbon oils thickened with soaps or other viscosity modifiers; animal fats, e.g., lard; and hydrogenated vegetable oils also can be used alone or combined with lower-viscosity liquids.

The cement also can be combined with an alcohol, e.g., methanol, isopropanol, butanol, sec-butyl alcohol, amyl alcohol, glycol, or glycerol; a ketone, e.g, acetone or methyl ethyl ketone; an ester, e.g., dibutyl phthalate or acetyl tributyl citrate; dimethyl sulfoxide; or dimethylformamide; but the setting time of cement from slushes with these compounds generally is much longer than that from slushes with hydrocarbons.

The slush-forming liquid is inert with respect to the cement, and in the case of cements which set by hydration is substantially anhydrous, and preferably water-immiscible. The latter property affords maximum shelf life, preventing the cement from setting should the slush accidentally come into contact with water prior to use.

The liquid which is reactive with the inorganic cement can be a single-phase material such as water, or a solution. For example, when the cement is a refractory metal oxide such as magnesium oxide, which reacts rapidly with phosphoric acid or aqueous phosphate solutions to form a hard product, the reactive liquid will be an aqueous solution of phosphoric acid or one or more of the phosphates described in the aforementioned patents related to phosphate cements. The reactivity of this liquid can be produced in situ when the components are brought together, e.g., by the dissolving of solid phosphorus pentoxide, present in the first component, in water, present in the second component.

Sand is present in a controlled amount as a filler in one or both of the components of the grouting composition. For a given system, the shear strength of the hardened grout increases with increasing sand content up to about 60-70 percent by weight based on the total weight of the two components. At the same time, however, mixing of the components becomes increasingly difficult as the sand content increases. Also, too high a sand content, e.g., 90 percent or more based on the total weight of the grout, results in a brittle, impact-sensitive product which is of no use for anchoring a reinforcing member in a hole. Therefore, while a sand content of up to about 80 percent can be employed, a content above about 70 percent is not preferred on the basis of ease of mixing and because there is little if any shear strength increase to be gained by exceeding 70 percent. Also, a sand/cement weight ratio in the range of about from 1/1 to 4/1 is preferred. Usually at least about 10 percent, and preferably at least about 20 percent, of the total weight of the two components will be sand.

The manner in which the sand is distributed between the reaction components has no significant effect on the shear strength of the hardened grout. Thus, 100 percent of the sand can be in the cement slush or 100 percent in the reactive liquid. Alternatively, the sand can be distributed in any other proportions, e.g., 1/1, between the two reaction components. The specific sand distribution in any given case usually will be selected on the basis of that which gives a desired viscosity balance and ease of mixing. In a system in which the components are pumped and mixed at the site of use, it may be more convenient to include the sand in only one of the components.

In the inorganic cement grouting system of this invention the sand in the grouting composition is graded sand, i.e., sand having, in a size cut which includes 90 percent or more of the particles, maximum and minimum sizes that deviate by more than about 20 percent from the median particle size of the cut. It has been found that graded sand produces bolt-anchoring grouts having higher shear strengths than those made from compositions containing uniform sand. Inasmuch as graded sands having a 30 percent or more particle size deviation are commonly available, these often will find use in the present system. Although I do not intend that my invention be limited by theoretical considerations, it is believed that the advantageous effect of graded sand in the composition, as contrasted to uniform sand, may be related to a better distribution and packing of sand particles in the cement slush or in the reactive liquid.

In the present grouting system, the sand preferably is substantially free, and in any case contains no more than about 10, and preferably no more than about 5, percent by volume, of particles larger than about 600 microns. Compositions containing more particles of this size have to have a higher liquids/solids ratio to facilitate pumping, e.g., during packaging operations, and the liquids content necessary for pumpability may result in a weaker grout. With particles larger than about 600 microns, there is a greater likelihood that the sand particles will be able to pierce through film cartridges of the grout, especially at the ends of the cartridge where the film is gathered together and held in place by a metal clip, thus resulting in leakage. Larger than 600-micron particles also are deleterious to the composition in that they make the insertion of a bolt difficult. Such particles have a greater tendency to settle out of the cement slush or reactive liquid, thereby causing cartridged grouts to be harder and stiffer in one area than in another, and making it difficult for a bolt to be inserted therein. Bolt insertion also is easier when the sand has round, rather than jagged, particles, and therefore round-particle sands are preferred.

the hardened grout produced around the reinforcing member forms as a result of the reaction between the inorganic cement in the first component and the liquid in the second component. Organic resin-curing systems are not required, and the reactant(s) which undergo a hardening reaction therefore are substantially all-inorganic. The development of strength in the hardened grout sufficient to anchor a bolt securely in place in a hole in a mine roof, and provision of the components in a form such that they can be delivered and mixed conveniently, require a balance of the content of inorganic cement, slush-forming liquid, reactive liquid, and sand. On this basis, although it is possible to make a marginally satisfactory grout from compositions containing 5-10 percent cement, in order to provide maximum strength capability it is preferred that the amount of cement constitute more than 10 percent of the total weight of the two components. Sufficient reactive liquid should be present to react with the cement, e.g., sufficient to give a water/cement weight ratio of at least about 0.1, and preferably at least about 0.3 in the case of cements that set by hydration. In order to be able to allow for the incorporation of a sufficient amount of sand and reactive liquid into the system, the amount of cement will not exceed about 80 percent of the total weight of the two components; and a maximum cement content of about 50 percent is preferred inasmuch as no advantage in terms of final strength is seen in exceeding this amount.

The specific amounts of liquids used in the two components will depend on the amount of solids present, ease of delivery, mixing, etc. From strength considerations, it is undesirable to exceed significantly the stoichiometric amount of reactive liquid and the amount of slush-forming liquid required to give the necessary lubricity and deliverability (e.g., pumpability). A liquids/solids weight ratio of the combined components in the range of about from 0.1 to 0.6 is satisfactory from the viewpoint of strength, and handling and mixing considerations. In accordance with these considerations, the water/cement weight ratio in cement systems that set by hydration generally will not exceed about 1.0, preferably 0.7; and the amount of water, based on the total weight of the two components will be about from 2 to 50, and preferably 5 to 30 percent. Also, the amount of slush-forming liquid (nonreactive liquid in the first component) will vary about from 5 to 50, preferably 8 to 20, percent of the total weight of the two components; or about from 10 to 75 percent, preferably 35 to 65 percent, of the weight of the cement.

The reactive liquid in the second component of the grouting composition used in the present invention preferably is in thickened form. This reduces the chance that the liquid will run out of an upward-slanting hole or soak into fissures or pores in the hole wall. Also, the thick liquid may impart a lubricating effect to the reactive liquid component, thereby facilitating the insertion of a bolt therein, which effect is especially advantageous when sand is suspended in the liquid, the sand having less tendency to settle or pack in the thick liquid. If the reactive liquid is not per se sufficiently thick, a thickening agent can be added. The thickening agent is a solid material that absorbs water, is hydratable, or is somewhat water-soluble, and can be an inorganic material such as a clay or fumed silica, or an organic material. Organic thickening agents that can be used include carboxymethylcelluloses, polyvinyl alcohols, starches, carboxy vinyl polymers, and other mucilages and resins such as galactomannans (e.g., guar gum), polyacrylamides, and polyethylene oxides.

The amount of thickening agent in the reactive liquid component depends on the specific material used, and specifically on the degree of thickening of the liquid component attainable therewith, a function generally of the molecular weight and degree of substitution of the material, and depends also on other solid materials which may be incorporated in the reactive liquid component. Generally, the amount of thickening agent will be in the range of about from 0.01 to 5 percent of the total weight of the two reaction components, the lower end of the range being used with materials of higher molecular weight and/or having more hydrophilic groups. In the case of the organic polymers, more than about 0.2 percent, based on the total weight of the two reaction components, usually will not be necessary.

One or more surface-active agents can be incorporated into the reaction system, in either one or both of the components. A surface-active agent in the cement slush or in the reactive liquid component containing suspended sand particles produces the consistency of a smooth paste, which results in improved ease of mixing of the components. The surface-active agent should be soluble in the liquid of the component in which it is used, and should give a hydrophilic-lipophilic balance value of about from 8 to 14, as determined according to the methods outlined in "The Atlas HLB System", Atlas Chemical Industries, Inc., 1962. Only about 0.01 to 1.0 percent of surface-active agent is needed based on the total weight of the two components. However, since the presence of a surface-active agent can result in a hardened grout of lower shear strength, it is necessary to assess what effect, if any, the surfactant under consideration has on strength, and to balance this finding against the advantage to be gained in ease of mixing. Surfactants which can be used include sorbitan monoöleate and monolaurate, polyoxyethylene monoöleate and hexaoleate, polyoxyethylene sorbitan trioleate and monolaurate, and polyoxyethylene tridecyl ether. Of these, all are oil-soluble except the polyoxyethylene sorbitan esters, which are water-soluble, although the tridecyl ether is only sparingly soluble in oil.

The present grouting system can be used wherever structure reinforcement is required, e.g., in rock bolting of roof bolting in coal or metal mines, or to secure bolts in holes drilled in concrete structures. While the system may itself provide the reinforcement without a bolt, it finds its greatest advantage in bolt anchoring because anchored bolts give better reinforcement and because a bolt or the like may be used in any case to mix the components in the drill hole. In one embodiment, the components of the system are delivered to the drill hole by pumping through separate feeding conduits communicating with the hole either prior to or after the bolt has been inserted, preferably before bolt insertion. The pumped components can be brought together and mixed just outside the hole, at the hole opening, or in the hole. Preferably, however, they are pumped separately into the hole and mixed therein. A preferred system comprises a frangible compartmented package having the two components in separate compartments, e.g., as shown in U.S. Pat. Nos. 3,795,081 and 3,861,522, the disclosures of which are incorporated herein by reference. In use, this package is inserted into a drill hole, and a bolt is forced into the package, tearing the film and penetrating a part or the full length of the package. The components are mixed by rotation of the bolt, and subsequently react with hardening so as to secure the bolt in the hole.

The invention will now be illustrated by way of the following examples. Parts are by weight.

EXAMPLE 1

A two-component reaction system of the following composition was made:

| Component A | Component B |
| --- | --- |
| 19.05% cement | 0.12% polyacrylamide |
| 28.57% sand | 28.57% sand |
| 11.43% oil | 12.26% water |

The percentages are percent of the ingredients by weight, based on the total combined weight of the two components. The cement was "Very High Early Strength" (VHE) cement, manufactured by U.S. Gypsum, a fast-setting hydraulic cement described in U.S. Pat. No. 3,860,433. The sand was Ottawa Silica Company's Banding Sand. This sand has round particles, 94% of which are in the size range of 74 to 210 microns. The median particle size is 142 microns, and the deviation ± 48%. The sand has 99% of its particles smaller than 420 microns. The surface area of the sand is about 160 $cm^2/g$. The oil was kerosene. The slush of cement, sand, and oil was kept separated from the thickened water/sand combination. For strength testing, the two components were mixed to substantial homogeneity, whereupon oil was exuded therefrom, and the resulting paste-like composition hardened.

The shear strength of the grout, measured after 24 hours, was 4800 psi. The method of measurement was the following:

A sample of the freshly mixed grout was placed on polyethylene terephthalate film, and a stainless steel ring, 0.625 inch (15.9 mm) in diameter and 0.115 inch (2.92 mm) high, was placed on the grout. A piece of polyethylene terephthalate film was placed over the ring, and the latter then was pressed evenly into the grout by means of a block of wood. The resulting "shear button" of the grout was placed on an Instron testing machine (conforming to ASTM Method E4, Verification of Testing Machines), and tested (24 hours after mixing) for shear strength by the method of ASTM D732. In this test, a plunger was brought down onto the grout at a rate of 0.5 inch (12.7 mm) per minute. The shear strength was calculated from the applied force to cause failure, according to the following equation:

$$\text{shear strength (psi)} = \frac{\text{Force (lbs)}}{\text{Specimen thickness} \times \pi \times \text{diam. of punch}}$$

The grout also was evaluated after 24 hours in terms of its average pull strength, i.e., 1.26 tons/inch (450 kg/cm), according to the following procedure:

Freshly mixed grout was placed in a section of 1-inch (2.54 cm) threaded pipe, and a standard 0.625-inch (1.59-cm) diameter steel blunt reinforcing rod was inserted into the grout. The excess grout which was squeezed out during insertion of the rod was scraped off, and the pipe-rod assembly was placed into a test fixture mounted in an Instron Universal Testing Machine. The rod was then pulled (24 hours after the mixing of the grout) by applying a measured upward force to the bolt while the pipe section of the pipe-rod assembly was held stationary in the fixture. The force in tons at which the first discontinuity in the recorded force vs. deflection curve was observed was the pull strength.

EXAMPLE 2

Four dual-compartment frangible packages in the form of 18-inches (46 cm)-long, 0.9-inch (2.3 cm)-diameter "chub" cartridges as described in U.S. Pat. Nos. 3,795,081 and 3,861,522 and as is shown in FIG. 1 herein, and containing a two-component reaction system of the invention, were made from a web of polyethylene terephthalate film. One compartment contained a slush of the cement, sand, and oil described in Example 1. The other compartment contained water and the sand and thickener described in Example 1. The ingredients content based on the total combined weight of the contents of the two compartments was as follows:

|  | Cartridges a and b | Cartridges c and d |
| --- | --- | --- |
| cement | 34% | 32% |
| oil | 13% | 13% |
| sand | 31.4%* | 30.2%** |
| water | 21.6% | 24.8% |
| thickener | 0.10% | 0.10% |

*26% in the cement slush; 5.4% in the water
**24% in the cement slush; 6.2% in the water Each sealed cartridge was placed in a one-inch (2.54 cm)-diameter steel pipe having a rough wall and a welded closure at one end (simulated drill hole). The pipe was held in an upright position in a vise with the closed end uppermost. A headed reinforcing rod (bolt) 0.625 inch (15.9 mm) in diameter was inserted into the cartridge with a rotating upward motion, and spun at 300 rpm to mix the contents of the package. A washer closed off the bottom end of the pipe. Ambient temperature was 80° F. After 1 hour the pull strength of the grout was determined by applying force to the headed end of the bolt in a downward direction at a rate of 0.5 inch (1.27 cm) per minute. The results are shown in the following table:

| Cartridge | Mixing Time (sec) | Force Required To Cause Slippage |
| --- | --- | --- |
| a | 7.5 | 11.2 tons (10 × $10^3$ kg) |
| b | 20 | 13.2 tons (10.6 × $10^3$ kg) |
| c | 7.5 | 10 tons (8 × $10^3$ kg) |
| d | 17.5 | 10.2 tons (8.2 × $10^3$ kg) |

EXAMPLE 3

The following separate components were prepared:

| Component A (parts) | Component B (parts) |
| --- | --- |
| cement (26.32) | sand (19.74) |
| sand (19.74) | 1% aqueous solution of |
| oil (14.47) | polyacrylamide (19.74) |

The sand and oil were the same as those used in Example 1. Four different mixes of Component A were prepared, each with a different cement. The 24-hour shear strength of the grout prepared by mixing each one of the four A Components with Component B was measured as described in Example 1. The results were as follows:

| Cement in Component A | Shear Strength (psi) |
|---|---|
| VHE Cement | 2100 |
| Ordinary Portland (Type II) | ~66 |
| "Rapid Rock" (Tamms Industries Co.) | ~50 |
| "Red Line" (Tamms Industries Co.) | ~16 |

EXAMPLE 4

The effect of sand content on the 24-hour shear strength of the grout was examined with a system wherein 28.6 parts of the cement described in Example 1 and 14.3 parts of the oil described in Example 1 formed one component, and 14.3 parts of a 1 percent aqueous polyacrylamide solution formed the other component, and an amount of sand was divided evenly between the two components. The results are shown in the following table:

| Sand | | Shear Strength (psi)* |
|---|---|---|
| Parts | % | |
| 0 | | 3059 |
| 10 | 14.9 | 3461 |
| 20 | 26 | 4196 |
| 50 | 46.8 | 10531 |

*Measured as described in Example 1.

EXAMPLE 5

A reaction system in which 18.7 percent cement and 13.1 percent oil (same cement and oil as in Example 1) were in Component A, 12.1 percent of a 1 percent aqueous solution of polyacrylamide was in Component B, and 56.1 percent sand (the sand used in Example 1) was located as indicated in the following table, was tested for shear strength as described previously:

| | 24-hr Shear Strength (psi) |
|---|---|
| 100% in Component A | 4670 |
| 100% in Component B | 4115 |
| 50% in Component A<br>50% in Component B | 4164 |

These results show that the distribution of sand between the components has no significant effect on the shear strength of the hardened grout inasmuch as all of the values are within ± 10 percent of the average value, a deviation possibly due to experimental error in the test procedure.

EXAMPLE 6

Different organic liquids were tested as slush-forming liquids by combining 20 parts of VHE cement with 10 parts of the liquid being tested, adding 10 parts of water to the resulting slush, mixing the cement and water components, and testing the resulting grout qualitatively for hardness. The results were as follows:

| Slush-Forming Agent | Grout Characteristics |
|---|---|
| pentane | hard in ~7 min |
| hexane | hard in ~7 min |
| heptane | hard in ~7 min |
| benzene | hard in ~5 min |
| toluene | hard in ~10 min |
| xylene | hard in ~7 min |
| gasoline | hard in ~8 min |
| fuel oil #2 | hard in ~9 min |
| kerosene | hard in ~6 min |
| Nujol | hard in ~23 min |
| methanol | hard in ~7 hr |

When the above-described procedure was followed without the addition of a slush-forming liquid, the grout became hard in 5 minutes.

EXAMPLE 7

The following separate components were prepared:

| Component A (parts) | Component B (parts) |
|---|---|
| cement (28.57) | sand (42.86) |
| oil (14.29) | water (14.29) |

The cement and oil were the same as those used in Example 1. Three different mixes of Component B were prepared, each with a different sand. The 24-hour shear strength of the grout prepared by mixing each one of the three B components with Component A was measured as described in Example 1. The results were as follows:

| Sand In Component B | Sand Characteristics | Shear Strength (psi) |
|---|---|---|
| Banding Sand | See Example 1 | 3510 |
| "Sakrete" Sand (−35 mesh)* | 95% 147–420μ; median 288μ; deviation ± 45%. 100% <540μ. Jagged. | 3360 |
| Sawing Sand (Ottawa Silica Co.) | 95% 297–420μ; median 358μ; deviation ± 17%. 96% <540μ. Round. | 1670 |

*All-purpose "Sakrete" sand packaged by H. T. Campbell Company, Towson, Maryland

EXAMPLE 8

The procedure described in Example 7 was repeated with seven different graded sands in Component B. In this case, the cement content was 18.5 parts, oil 14.8 parts, sand 55.6 parts, and water 11.1 parts. All of the sands had round particles and were products of the Ottawa Silica Company, Ottawa, Illinois, and described in Ottawa's Product Data Sheet OD 3-74-0. The results were as follows:

| | SAND | PARTICLE SIZE (μ) | | | | SHEAR STRENGTH (PSI) |
|---|---|---|---|---|---|---|
| | | RANGE | MEDIAN | DEVIATION | MAX. | |
| (a) | Special Bond | 96% 105–297 | 201 | 48% | 100% <540 | 3180 |
| (b) | Bond Sand | 97% 105–297 | 201 | 48% | 100% <540 | 3640 |
| (c) | Fine Special Blend | 96% 140–420 | 280 | 50% | 100% <540 | 3570 |
| (d) | 50-Mesh | 91% 105–210 | 157 | 33% | 99% <420 | 3200 |
| (e) | Banding Sand | 94% 74–210 | 142 | 48% | 99% <420 | 3200 |
| (f) | 90 Shell | 96% 74–210 | 142 | 48% | >99% <420 | 3300 |
| (g) | F-140 | 98% <53–147 | ~100 | 47% | >99% <297 | 2730 |

EXAMPLE 9

This example shows the beneficial effect of the thickening agent in the water component when sand is present therein. A 1-inch (2.54-cm)-inner-diameter steel pipe was filled with a mixture of 66.7 percent sand and 33.3 percent water, and a 0.625-inch (15.9-mm)-diameter steel reinforcing rod was moved downward into the mixture in an Instron machine at a rate of 20 inches (51 cm) per minute. A force of 4000 pounds was required to insert the bolt 1 inch for banding sand and 1.5 inches for "Sakrete" sand. When 1 part of polyacrylamide was added to 100 parts of the water used to make the sand-water mixture, forces of only 0.5 (banding sand) and 143 ("Sakrete" sand) pounds per inch of insertion were required even when the sand/water ratio was 75/25. When polyethylene oxide was substituted for polyacrylamide, the forces were 0.6 and 13 pounds per inch, respectively.

EXAMPLE 10

The following components were prepared:

| Component A | Component B |
|---|---|
| VHE cement (31.16 parts) | sand* (46.74 parts) |
| oil* (6.23 parts) | 1% aqueous solution polyacrylamide |
| Span 80** (0.12 part) } HLB=9.1 | |
| Tween 85 (0.16 part) | (15.58 parts) |

*Same as in Example 1
**Sorbitan Monoöleate

Component A (113 parts) and Component B (187 parts) were packed into the separate compartments of the polyethylene terephthalate film cartridge described in Example 2. The cartridge grout was subjected to a pull strength test in a simulated drill hole as described in Example 2. Twenty-four hours after the components had been mixed, the pull strength of the hardened grout was 12 tons.

EXAMPLE 11

A grout sets up rapidly when a cement component consisting of a slush of magnesium oxide, sand, and Circosol 304 (a light-colored process oil) is mixed with an aqueous solution of ammonium diacid phosphate. When mixed in a hole and allowed to react around a bolt, the hardened grout firmly anchors the bolt in the hole.

EXAMPLE 12

The procedure described in Example 7 was repeated twice, once with a graded sand, i.e., the −35 mesh "Sakrete" described in Example 7, and once with a uniform sand, i.e., the 297-420 micron cut from the −35 mesh "Sakrete". The median particle size of the uniform sand was 358 microns, and the deviation ± 17%. The 24-hour shear strength of the grout containing the graded sand was 6740 psi, and that of the grout containing the uniform sand 5060 psi.

EXAMPLE 13

Two different sands were tested with respect to their settling rates in thickened water, as an indication of their behavior in stored two-compartment cartridges having a cement slush in one compartment and a sand/water mixture in the other. Segregation of the sand results in an asymmetrical package, which is harder and stiffer in one section than in another, making bolt insertion more difficult.

Both sands were "Sakrete". One was a coarse sand consisting solely of particles larger than 500 microns (53% larger than 833 microns, 12% larger than 2.36 mm, the remainder between 540 and 833 microns). The other was a fine sand consisting of the −35 mesh "Sakrete" described in Example 7.

Twelve-inch (31-cm) tubes having a 1-inch (2.5-cm) diameter were filled with a 1% aqueous solution of polyacrylamide, and the sand was added to the tubes. The settling rate at 20° C. was about 20 minutes for about 90% of the coarse sand, and about 46 minutes for about 90% of the fine sand.

I claim:

1. In a grouting system for use in a hole in combination with a reinforcing member wherein a hardened grout is formed around the reinforcing member in the hole by the reaction of at least two mixed components of an inorganic grouting composition, thereby anchoring the reinforcing member in the hole, a first component of the inorganic grouting composition comprising a slush of a particulate inorganic cement and a liquid which is nonreactive therewith, a second component, separated from the first, comprising being a liquid which is reactive with said inorganic cement, and sand being present in at least one of the components, the improvement comprising, as the sand, a graded sand wherein the deviation of the maximum and minimum particle sizes from the median particle size of a size cut which includes 90 percent or more of the particles is more than about ± 20 percent, and wherein particles larger than about 600 microns constitute no more than about 10 percent of the total sand volume, sand having such grading and fineness imparting higher shear strength to the hardened grout, and facilitating the use of said grouting composition in packaged form.

2. A grouting system of claim 1 wherein said sand is present in an amount such as to constitute about from 20 to 80 percent of the total weight of said components.

3. A grouting system of claim 1 wherein said inorganic cement is a cement that sets by hydration, and said liquid reactive therewith is water.

4. A grouting system of claim 1 wherein said liquid nonreactive with said inorganic cement is a hydrocarbon.

5. A grouting system of claim 2 wherein said liquid in said second component is thickened by the presence of a polymeric material therein.

6. A grouting system of claim 3 wherein said grouting composition contains about from 10 to 80 percent cement, about from 2 to 50 percent water, about from 5 to 50 percent hydrocarbon, and about from 10 to 70 percent sand, based on the total weight of the components of the composition, the water/cement weight ratio being about from 0.3 to 0.7, the cement/sand weight ratio being about from 0.25 to 1, and the weight ratio of hydrocarbon to cement being about from 0.1 to 0.75.

7. A grouting system of claim 4 wherein said components are located in separate first and second compartments of a frangible package in position in said hole, said package being adapted to be penetrated and broken by the reinforcing member, and said components to be mixed in said hole by the rotation of said reinforcing member, hardened grout forming around said reinforcing member so as to secure it firmly in said hole.

* * * * *

UNITED STATES PATENT OFFICE
CERTIFICATE OF CORRECTION

PATENT NO. : 4,127,001
DATED : November 28, 1978
INVENTOR(S) : Ernst Alois Tomic It is certified that error appears in the above-identified patent and that said Letters Patent are hereby corrected as shown below:

Claim 1, line 10, delete "being". Claim 7, in line 1, insert --first and second-- between "said" and "compo-"; and in line 2, delete "first and second". Column 2, line 51, change "of" (first occurrence) to --or--.

Signed and Sealed this

Twenty-fourth Day of April 1979

[SEAL]

Attest:

RUTH C. MASON
Attesting Officer

DONALD W. BANNER
Commissioner of Patents and Trademarks